Patented Aug. 30, 1938

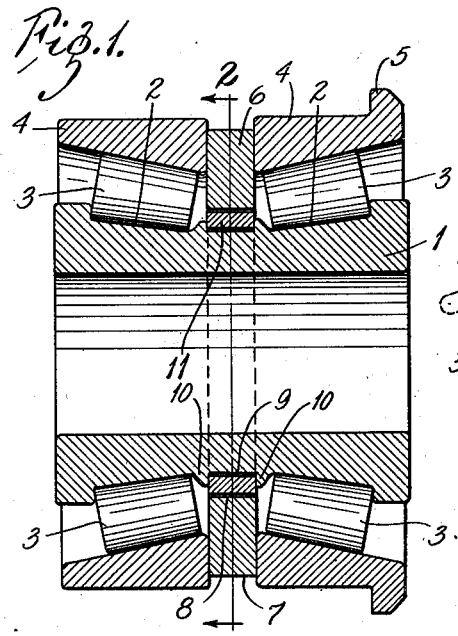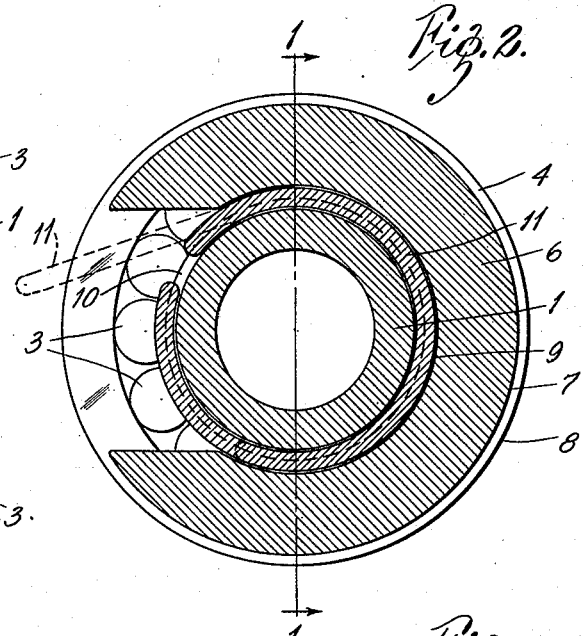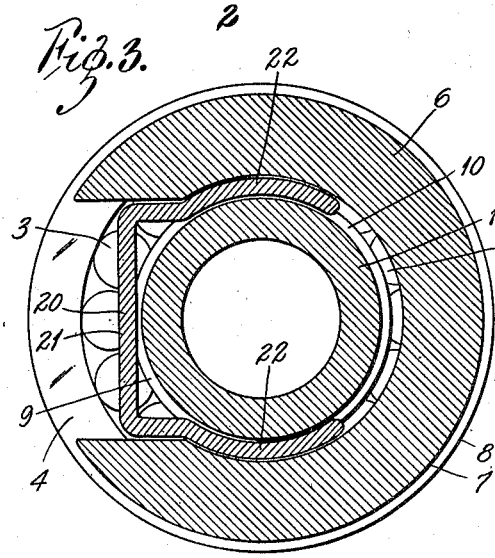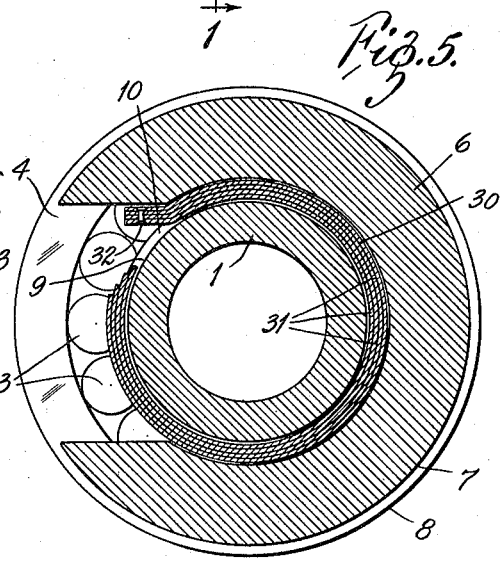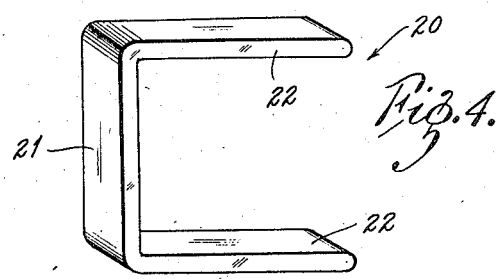

2,128,683

UNITED STATES PATENT OFFICE 2,128,683

DOUBLE ROW ROLLER BEARING

Harry R. Slusser and John B. Baker, Canton, Ohio, assignors to The Timken Roller Bearing Company, Canton, Ohio, a corporation of Ohio Application November 10, 1937, Serial No. 173,756

5 Claims. (Cl. 308—214)

Our invention relates to roller bearings of the type having two series of rollers and separate outer bearing members therefor, means being provided between said outer bearing members for holding them in proper position. The invention has for its principal object a bearing of this type which is easy to assemble, in which the outer bearing members are accurately positioned and in which accidental displacement of the positioning means is prevented.

The invention consists in the double row roller bearing and in the combination and arrangements of parts hereinafter described and claimed.

In the accompanying drawing,

Fig. 1 is a longitudinal sectional view on the line 1—1 of Fig. 2 of a double row bearing embodying my invention, Fig. 2 is a cross-sectional view on the line 2—2 in Fig. 1, Fig. 3 is a cross-sectional view of a modification, Fig. 4 is a detailed perspective view of the fastening device of Fig. 3 before mounting in the bearing; and Fig. 5 is a cross-sectional view of a modification.

In Figs. 1 and 2 is illustrated a rocker arm bearing constituting the preferred embodiment of our invention. A double inner bearing member or cone 1 has conical raceway portions 2 thereon that taper toward the middle of the bearing. On each raceway 2 is mounted a series of taper bearing rollers 3. A separate cup 4 or outer bearing member is provided for each series of rollers, one of said cups being provided with a peripheral flange 5 for mounting the bearing in a rocker arm or the like. The present invention is concerned with the means for holding bearing cups in proper spaced running position.

The cups 4 are spaced apart by means of a spacing and positioning washer 6 of substantially C-shape, whose outer periphery 7 is of a diameter somewhat less than the outer periphery of the cups and whose inner periphery 8 is of somewhat larger diameter than the portion of the cone around which it extends. The width or thickness of this C-washer 6 is selected to give the proper running clearance in the bearing.

The middle portion of the bearing cone 1 is provided with a groove or channel 9 in the general plane of the washer 6, the margins of said channel being formed by the low ribs 10 that prevent inward movement of the bearing rollers.

Inserted in said channel 9 is a strip 11 of material which is flexible enough to be forced around the cone, substantially filling the space between the channel 9 and the inner periphery 8 of the washer. Thus, removal of the washer 6 is prevented.

In Figs. 3 and 4 is shown a modification wherein the retaining device for the C-washer 6 is a clip 20 that is originally of channel-shape comprising an end wall 21 and projecting arms 22. The clip material is soft enough that the arms 22 can be forced into the space between the cone channel 9 and the inner periphery 8 of the C-washer 6, the end wall 21 of the clip being seated in the cone channel 9.

In Fig. 5 is shown another modification wherein the retaining member 30 is composed of a plurality of thin strips 31 held together at one end only, as by a rivet 32. These strips 31 are permitted to slide on each other to accommodate the curling movement of the assembled retaining member 30 around the inner periphery 8 of the C-washer and the channel 9 of the cone.

All of the above described constructions provide a bearing wherein proper running clearance between the parts is initially provided by the proper size of the space and positioning members, the bearings are easy to assemble and proper running clearance is easily obtained. If necessary, all of the modifications can be disassembled by removing the spacing and positioning members.

Obviously, numerous changes may be made without departing from the invention and we do not wish to be limited to the precise construction shown.

What we claim is:

1. A double row taper roller bearing comprising two annular series of conical rollers, a separate bearing cup for each series of rollers, said cups having their opposed ends spaced apart, an inner bearing cone having raceways for said rollers tapering towards the middle of the bearing and having a central peripheral groove, a C-shaped spacing and positioning washer between the opposed ends of said cups and means disposed in said cone groove and cooperating with said C-shaped member for holding it in place.

2. A double row taper roller bearing comprising two annular series of conical rollers, a separate bearing cup for each series of rollers, said cups having their opposed ends spaced apart, an inner bearing cone having raceways for said rollers tapering towards the middle of the bearing and having a central peripheral groove, a C-shaped spacing and positioning washer between the opposed ends of said cups and means disposed in said cone groove and cooperating with the inner periphery of said C-shaped member for holding it in place.

3. A double row taper roller bearing comprising two annular series of conical rollers, a separate bearing cup for each series of rollers, said cups having their opposed ends spaced apart, an inner bearing cone having raceways for said rollers tapering towards the middle of the bearing and having a central peripheral groove, a C-shaped spacing and positioning washer between the opposed ends of said cups and a curved strip in said cone groove and cooperating with the inner periphery of said C-shaped member for holding it in place.

4. A double row taper roller bearing comprising two annular series of conical rollers, a separate bearing cup for each series of rollers, said cups having their opposed ends spaced apart, an inner bearing cone having raceways for said rollers tapering towards the middle of the bearing and having a central peripheral groove, a C-shaped spacing and positioning washer between the opposed ends of said cups and a clip disposed in the open end of said washer and having portions extending into said cone groove and cooperating with said C-shaped member for holding it in place.

5. A double row taper roller bearing comprising two annular series of conical rollers, a separate bearing cup for each series of rollers, said cups having their opposed ends spaced apart, an inner bearing cone having raceways for said rollers tapering towards the middle of the bearing and having a central peripheral groove, a C-shaped spacing and positioning washer between the opposed ends of said cups and a plurality of strips held together at one end only and disposed in said cone groove and cooperating with the inner periphery of said C-shaped member for holding it in place.

HARRY R. SLUSSER.
JOHN B. BAKER.